Nov. 6, 1923.                                    1,472,971
W. A. GEIGER
DETACHABLE LINING FOR DRAFT GEAR FRICTION SHELLS
Filed Feb. 9, 1923
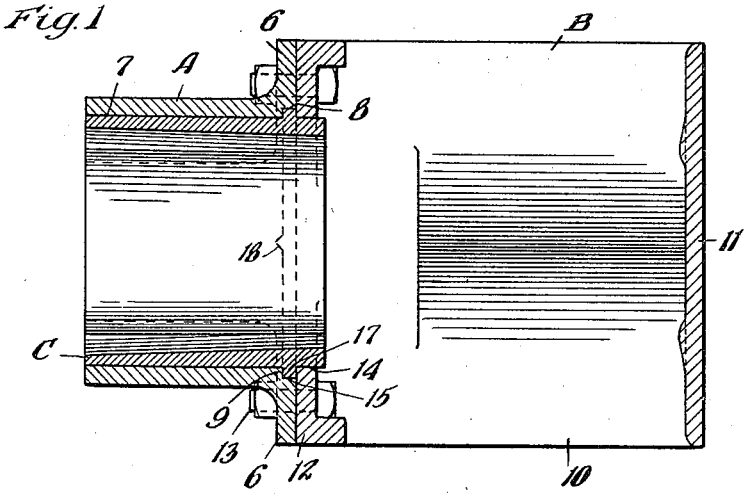
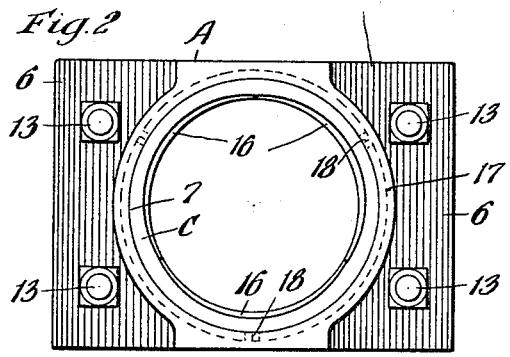
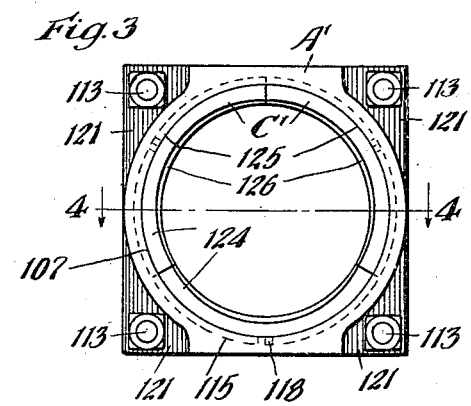
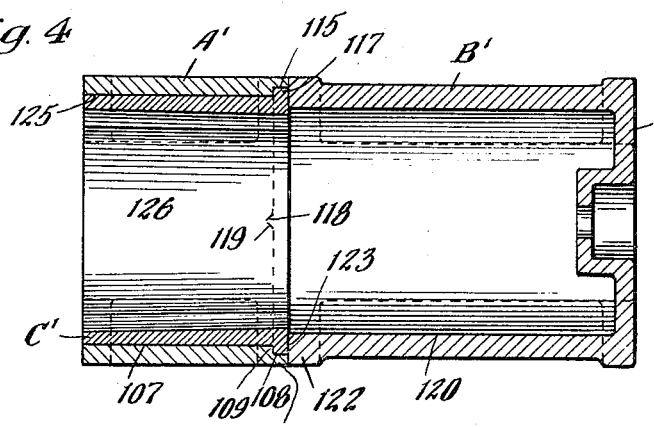
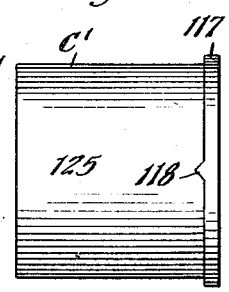
Witnesses
Hans M. Daehlitz
Inventor
William A. Geiger
By George I. Haight
His Atty Patented Nov. 6, 1923.

1,472,971

UNITED STATES PATENT OFFICE.

WILLIAM A. GEIGER, OF CHICAGO, ILLINOIS, ASSIGNOR TO WILLIAM H. MINER, OF CHAZY, NEW YORK.

DETACHABLE LINING FOR DRAFT-GEAR FRICTION SHELLS.

Application filed February 9, 1923. Serial No. 617,962.

*To all whom it may concern:*

Be it known that I, WILLIAM A. GEIGER, a citizen of the United States, residing at Chicago, in the county of Cook and State of Illinois, have invented a certain new and useful Improvement in Detachable Linings for Draft-Gear Friction Shells, of which the following is a full, clear, concise, and exact description, reference being had to the accompanying drawings, forming a part of this specification.

This invention relates to improvements in detachable linings for draft gear friction shells.

One object of the invention is to provide, in a friction shock absorbing mechanism more particularly adapted for railway draft riggings, a friction shell having interior friction surfaces, wherein the friction surfaces are formed on a readily removable and detachable lining.

Another and more specific object of the invention is to provide in connection with a detachable lining for friction shells, a simple, efficient and reliable means for retaining the lining in assembled relation with the shell.

Other objects and advantages of the invention will more clearly appear from the description and claims hereinafter following.

In the drawing, forming a part of this specification, Fig. 1 is a horizontal, longitudinal sectional view of a friction shell and spring cage of a railway draft rigging, showing my improvements in connection therewith. Fig. 2 is a front end elevational view, looking from the left of Fig. 1. Fig. 3 is a front end elevational view of a friction shell and spring cage, illustrating a modified form of the invention. Fig. 4 is a horizontal longitudinal sectional view corresponding substantially to the line 4—4 of Fig. 3. And Fig. 5 is a top plan view of one of the liners shown in Figure 3.

Referring, first to the construction of the invention shown in Figs. 1 and 2 of the drawing, A designates a friction shell casting, B a spring cage casting and C the detachable liner element.

The friction shell casting A is of cylindrical form and is provided at the rear end with laterally projecting flanges 6—6 on opposite sides thereof. The shell A is formed with a cylindrical bore 7 enlarged at the rear end as indicated by 8 to provide an annular shoulder 9.

The spring cage casting B is of rectangular boxlike form, open at opposite sides and provided with horizontally extending top and bottom walls 10, vertically extending rear wall 11 and vertically extending front wall 12. The spring cage casting B is secured to the rear end of the friction shell casting A by means of bolts 13 passing through the wall 12 of the spring cage casting and the flanges 6 of the friction shell casting at the corners. The front wall 12 of the spring cage casting B is provided with a circular opening 14 corresponding in diameter with the bore 7 of the friction shell casting A, thereby defining an annular groove 15 between the front face of the projecting portion of the wall 12 and the annular shoulder 9 of the friction shell casting A.

The detachable liner element C is of cylindrical form and adapted to fit within the bore 7 of the friction shell casting A. The liner C is provided with three, inwardly converging, interior friction surfaces 16, each of true cylindrical form and adapted to coact with the usual friction shoes. To retain the detachable liner in assembled relation with the friction shell A, the same is provided with an annular rim or flange 17 received within the groove 15.

In assembling my improved liner with the friction shell and spring cage castings, the same is inserted from the rear end of the friction shell casting A and the front face of the flange forced into engagement with the annular shoulder 9 of the friction shell casting A. The spring cage casting B is then assembled with the friction shell casting A by passing the projecting rear end of the liner through the opening 14 and bringing the front face of the wall 12 into abutting relation with the rear face of the flange 17. The friction shell casting A and the spring cage casting B are then drawn together by the bolts 13, thereby clamping the flange 17 of the liner tightly between the shoulder 9 and the wall 12.

To prevent rotation of the liner C relative to the friction shell casting A, the flange 15 is provided with one or more V-shaped lugs 18 engaging corresponding recesses formed in the face of the annular shoulder 9 of the friction shell casting A.

Referring to the modification illustrated in Figs. 3 and 4, A' indicates a cylindrical friction shell casting, B' a cylindrical spring cage casting and C' a cylindrical liner.

The friction shell casting A' is provided with a cylindrical bore 107 enlarged at the rear end as indicated at 108, thereby providing an annular shoulder 109.

The spring cage casting B' is also of hollow cylindrical form and is closed at the rear end by an end wall 111. As clearly shown in Fig. 4, the bore 120 of the spring cage casting B' is of smaller diameter than the bore 107 of the friction shell casting A'. The friction shell casting A' and the spring cage casting B' are held in assembled relation by bolts 113 passing through flanges 121 and flanges 122 formed integral with the friction shell casting A' and the spring cage casting B', respectively. When the friction shell casting A' and the spring cage casting B' are held in assembled relation, a groove 115 at the rear end of the shell A, is defined by the end face 123 of the spring cage casting B' and the shoulder 109 of the friction shell casting A'.

The liner C' is of sectional form, comprising three similar sections 124, each provided with an outer cylindrical surface 125 adapted to fit the curvature of the bore and an inner cylindrical friction surface 126 adapted to co-act with the usual friction shoes of the shock absorbing mechanism. The friction surfaces 126 of the liner sections 124 are of true cylindrical form and converge inwardly of the shell, as clearly shown in Fig. 4. Each of the liner sections 124 is provided at the rear end thereof with a peripheral flange 117 adapted to fit within the groove 115. The liner sections 124 are also provided with means for preventing rotation of the assembled liner sections relative to the friction shell casting A', each section having a V-shaped projection 118 formed on the front face of the flange 117 and adapted to engage within a corresponding recess 119 formed in the shoulder 109.

The liner C' is assembled with the friction shell and spring cage castings in a manner similar to that described in connection with the preferred form of the invention and is held in fixed position between the end face 123 of the spring cage casting B' and the shoulder 109 of the friction shell casting A' by the clamping action of the bolts 113.

I have herein shown and described what I now consider the preferred manner of carrying out the invention, but the same is merely illustrative and I contemplate all changes and modifications that come within the scope of the claims appended hereto.

I claim:

1. In a shock absorbing mechanism, the combination with a friction shell; of a spring cage detachably connected thereto; and a detachable lining for said friction shell, said lining and friction shell having inter-engaging means thereon for preventing relative longitudinal movement of the lining and friction shell in one direction; and means on said spring cage engaging said lining to prevent relative longitudinal movement of the shell and lining in the opposite direction, when the shell and spring cage are held in assembled relation.

2. In a friction shock absorbing mechanism, the combination with a friction shell; of a spring cage detachably connected to said shell; and a detachable lining within said friction shell, said lining having means thereon engaging the shell for preventing relative longitudinal movement of the lining and the shell in one direction, and said spring cage having means thereon adapted to engage said first named means. when the parts are in assembled relation, to prevent relative longitudinal movement of the lining and the shell in the opposite direction, whereby, the lining is held locked within the friction shell.

3. In a friction shock absorbing mechanism, the combination with a friction shell member; of a lining therefore having means on the inner end thereof engaging the shell for preventing outward movement of the lining with reference to said shell; of a spring cage secured to the shell member and having means on the end thereof engaging said first named means to prevent inward movement of the lining with reference to the shell, whereby the lining is held rigidly locked within the shell.

4. In a shock absorbing mechanism, the combination with a shell having a cylindrical bore; of a spring cage detachably secured to said shell; a liner element adapted to fit within said cylindrical bore, said liner element, friction shell and spring cage having inter-engaging means thereon for holding the liner element rigidly within the shell against movement in all directions.

5. The combination with a combined friction shell and spring cage, said friction shell being provided with a cylindrical bore; of a lining adapted to fit within the bore of the shell; inter-engaging means on said lining and combined shell and cage for preventing relative longitudinal movement in both directions of the lining in the shell; and means for preventing rotation of said lining within the shell.

6. In a friction shock absorbing mechanism, the combination with a friction shell having a rearwardly facing shoulder at the rear end thereof; of a lining therefor, said lining being provided with a flange, said flange having one side thereof in engagement with said shoulder; and a spring cage detachably secured to the shell, said spring cage having the outer face of one end thereof in engagement with the opposite side of said flange, whereby, the lining is held within the friction shell against longitudinal movement relative thereto.

7. As an article of manufacture, a cylindrical lining for friction shells for shock absorbing mechanisms, said lining being provided with a laterally projecting annular flange adapted to engage means on the shell to prevent longitudinal movement of the lining with reference to the shell, said lining being also provided with a plurality of longitudinally converging, true cylindrical interior friction surfaces.

8. As an article of manufacture, a sectional cylindrical lining for friction shells, said lining being provided with a laterally projecting annular flange at one end thereof, said lining being also provided with a plurality of longitudinally converging, true cylindrical friction surfaces, one of said cylindrical surfaces being formed on each section of said lining.

9. In a shock absorbing mechanism, the combination with a friction shell; of a spring cage detachably connected to said shell; and a detachable sectional lining within said friction shell, each section of said lining having means thereon engaging with the shell to prevent longitudinal movement in one direction of the lining with reference to the shell, and said spring cage having means thereon adapted to engage said first named means, when the parts are in assembled relation, to prevent longitudinal movement in the opposite direction of the lining with reference to the shell.

In witness that I claim the forgoing I have hereunto subscribed my name this 5th day of February, 1923.

WILLIAM A. GEIGER.

Witnesses:
 FRANCES SAVAGE,
 HARRIETTE M. DEAMER.